US010378565B2

(12) United States Patent
Roy et al.

(10) Patent No.: US 10,378,565 B2
(45) Date of Patent: Aug. 13, 2019

(54) ELECTRO-FLUID TRANSDUCERS

(71) Applicant: University of Florida Research Foundation, Inc., Gainesville, FL (US)

(72) Inventors: Subrata Roy, Gainesville, FL (US); Nicholas S. Campbell, Boulder, CO (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 24 days.

(21) Appl. No.: 15/511,034

(22) PCT Filed: Sep. 29, 2015

(86) PCT No.: PCT/US2015/052786
§ 371 (c)(1),
(2) Date: Mar. 14, 2017

(87) PCT Pub. No.: WO2016/053936
PCT Pub. Date: Apr. 7, 2016

(65) Prior Publication Data
US 2017/0284429 A1    Oct. 5, 2017

Related U.S. Application Data

(60) Provisional application No. 62/056,778, filed on Sep. 29, 2014.

(51) Int. Cl.
*F15C 1/00* (2006.01)
*F15D 1/00* (2006.01)
(Continued)

(52) U.S. Cl.
CPC .......... *F15D 1/0075* (2013.01); *B64C 23/005* (2013.01); *H05H 1/2406* (2013.01); *H05H 2001/2418* (2013.01); *Y02T 50/166* (2013.01)

(58) Field of Classification Search
CPC ...... F15D 1/0075; H05H 1/2406; H05H 1/00; H05H 1/0081; H05H 1/02; H05H 1/03; H05H 2001/2418
(Continued)

(56) References Cited

U.S. PATENT DOCUMENTS 4,254,800 A *  3/1981  Masaki ................. F15D 1/02
                                              137/13
5,151,164 A     9/1992  Blanchard et al.
(Continued)

OTHER PUBLICATIONS

International Search Report for PCT/US2015/052786 dated Dec. 14, 2015.
(Continued)

*Primary Examiner* — Minh Q Le
(74) *Attorney, Agent, or Firm* — Thomas | Horstemeyer, LLP

(57) ABSTRACT

The present disclosure is directed towards electro-fluid transducers that may influence the flow of a fluid in and around a channel. In one such embodiment, a system comprises a first electrode at least partially encapsulated by a first dielectric; a second electrode at least partially encapsulated by a second dielectric, wherein a portion of a channel exists between the first dielectric and the second dielectric; a third electrode positioned in the channel; and a fourth electrode positioned in the channel, wherein the electrodes influence a flow of a fluid in the channel upon the electrodes being energized.

20 Claims, 9 Drawing Sheets

(51) Int. Cl.
*B64C 23/00* (2006.01)
*H05H 1/24* (2006.01)

(58) Field of Classification Search
USPC .................................................. 137/827, 909
See application file for complete search history.

(56) References Cited

U.S. PATENT DOCUMENTS

| | | | | |
|---|---|---|---|---|
| 6,186,176 | B1* | 2/2001 | Gelbmann | G05D 7/03 137/251.1 |
| 6,711,984 | B2 | 3/2004 | Tagge et al. | |
| 7,380,756 | B1 | 6/2008 | Enloe et al. | |
| 7,703,479 | B2 | 4/2010 | Jacob | |
| 8,235,072 | B2 | 8/2012 | Roy | |
| 8,616,239 | B2* | 12/2013 | Bell | F17D 1/16 137/13 |
| 9,016,318 | B2* | 4/2015 | Mankame | F15B 21/065 137/827 |
| 2003/0030374 | A1* | 2/2003 | Pai | A61L 2/14 313/582 |
| 2003/0031610 | A1* | 2/2003 | Ricatto | B01J 19/088 422/186.04 |
| 2003/0127329 | A1 | 7/2003 | DeVoe et al. | |
| 2004/0208751 | A1 | 10/2004 | Lazar et al. | |
| 2005/0005948 | A1* | 1/2005 | Kurunczi | A61L 2/14 134/1 |
| 2005/0016456 | A1* | 1/2005 | Taguchi | H05H 1/2406 118/723 E |
| 2005/0214181 | A1* | 9/2005 | Kaneko | B01D 53/32 422/186.04 |
| 2006/0162741 | A1* | 7/2006 | Kurunczi | A61L 2/14 134/1.1 |
| 2007/0119827 | A1 | 5/2007 | Miller et al. | |
| 2008/0264506 | A1* | 10/2008 | Beerling | B01L 3/502792 137/831 |
| 2010/0000620 | A1* | 1/2010 | Fouillet | B01L 3/50273 137/827 |
| 2010/0127624 | A1* | 5/2010 | Roy | B64C 23/005 315/111.21 |
| 2011/0108539 | A1* | 5/2011 | Grabau | H05H 1/2406 219/260 |
| 2012/0097539 | A1 | 4/2012 | Qian et al. | |
| 2012/0281798 | A1 | 11/2012 | Thompson et al. | |
| 2013/0075382 | A1 | 3/2013 | Roy | |
| 2014/0291506 | A1* | 10/2014 | Tikhonski | H05H 1/2406 250/282 |
| 2015/0239552 | A1* | 8/2015 | Nikic | B64C 19/00 244/207 |
| 2015/0273231 | A1* | 10/2015 | Kim | A61N 1/44 604/23 |
| 2017/0018409 | A1* | 1/2017 | Akita | H01J 37/32541 |

OTHER PUBLICATIONS

Cattafesta, et al., "Actuators for Active Flow Control", Annual Review of Fluid Mechanics, 2011, vol. 43, pp. 247-272.

* cited by examiner

ELECTRO-FLUID TRANSDUCERS

CROSS-REFERENCE TO RELATED APPLICATION

This application is the 35 U.S.C. § 371 national stage application of PCT Application No. PCT/US2015/052786, filed Sep. 29, 2015, where the PCT Application claims priority to U.S. provisional application entitled "Electro-Fluid Transducers," having Ser. No. 62/056,778, filed Sep. 29, 2014, both of which are herein incorporated by reference in their entireties.

BACKGROUND

Atmospheric plasma driven active and passive flow control devices have been extensively studied in recent years.

SUMMARY

Embodiments of the present disclosure relate to electro-fluid transducers that may influence the flow of a fluid in and around a channel. In one such embodiment, a system comprises a first electrode at least partially encapsulated by a first dielectric; a second electrode at least partially encapsulated by a second dielectric, wherein a portion of a channel exists between the first dielectric and the second dielectric; a third electrode positioned in the channel; and a fourth electrode positioned in the channel, wherein the electrodes influence a flow of a fluid in the channel upon the electrodes being energized.

An additional example of such an embodiment comprises a first electrode and a second electrode associated with a first side of a channel; a third electrode and a fourth electrode associated with a second side of the channel; and a fifth electrode positioned in the channel, wherein the electrodes influence a flow of a fluid in the channel upon the electrodes being energized.

An exemplary embodiment of a method in accordance with the present disclosure comprises energizing a first electrode, a second electrode, a third electrode, and a fourth electrode to influence a flow of a fluid in a channel, wherein a portion of the channel is located between the first electrode and the second electrode and wherein the third electrode and the fourth electrode are located in the channel.

BRIEF DESCRIPTION OF THE DRAWINGS

The disclosed apparatuses, systems, and methods can be better understood with reference to the following drawings. The components in the drawings are not necessarily drawn to scale.

DETAILED DESCRIPTION

The present disclosure is directed towards electro-fluid transducers that may influence the flow of a fluid in and around a channel. The transducer systems described herein have a variety of applications. For example, such transducer systems may be used to modify the boundary layer of an object to, for example, reduce drag for the object. Furthermore, the transducer systems may be used to generate an air curtain for a refrigeration system. The embodiments described herein may be used in other applications as well.

Figure 1:
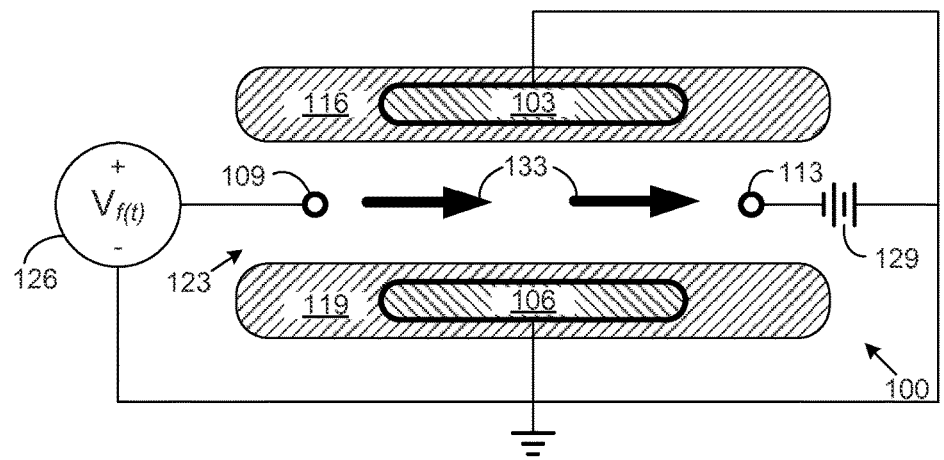
FIGS. 1-16 are diagrams of examples of transducer systems utilizing various energizing configurations in accordance with embodiments of the present disclosure.

With reference to FIG. 1, shown is a first example of a transducer system 100. The transducer system 100 shown in FIG. 1 includes electrodes 103-113 and/or other components. The electrode 103 is encapsulated within a dielectric 116, and the electrode 106 is encapsulated within a dielectric 119. A channel 123 (e.g., an open passageway) exists between the dielectrics 116-119. In some embodiments, the dielectrics 116-119 may be a portion of one or more walls that define the channel 123. In other embodiments, the dielectrics 116-119 may be disposed on the surface of one or more walls that define the channel 123. In alternative embodiments, the dielectrics 116-119 may be embedded within the one or more walls that define the channel 123. In any case, a channel 123 exists between the dielectrics 116-119, and a fluid, such as air or any other fluid, may be present in and around the channel 123. As shown in FIG. 1, the electrodes 109-113 are located in the channel 123.

The electrodes 103-113 may be energized by applying various electric potentials to the respective electrodes 103-113. To this end, the electrodes 103-113 may be coupled to one or more power sources, as will be further described. It is emphasized that the various configurations described herein to energize the electrodes 103-113 are non-limiting examples of configurations for energizing the electrodes 103-113. Alternative configurations for energizing the electrodes 103-113 are within the scope of the present disclosure.

For the embodiment shown in FIG. 1, the electrodes 103-106 are coupled to ground, and the electrode 109 is coupled to the positive terminal of a time-varying voltage source 126. For example, the output of the voltage source 126 may have a waveform that is sinusoidal, square, triangular, etc. In alternative embodiments, the voltage source 126 may not vary with time.

For the embodiment shown in FIG. 1, the electrode 113 is coupled to the negative terminal of a constant voltage source 129. In alternative embodiments, the voltage source 129 may be a time-varying voltage source 129.

In the embodiment shown in FIG. 1, the electric potential of the electrode 109 may be higher than the electric potential of the electrodes 103-106. As a result, a Lorentz force may be generated due to the electric field that exists between the electrode 109 and the electrodes 103-106. Similarly, because the electric potential of the electrodes 103-106 are higher than the electric potential of the electrode 113, the electric field from the electrodes 103-106 to the electrode 113 may generate a Lorentz force. These Lorentz forces may induce flow of the fluid in the channel 123 in the direction indicated generally by the arrows 133. Further information regarding electrodes generating Lorentz is provided in U.S. Pat. No. 8,235,072, titled "Method and Apparatus for Multibarrier Plasma High Performance Flow Control," issued on Aug. 7, 2012; US. Publication No. 2013/0038199, titled "System, Method, and Apparatus for Microscale Plasma Actuation," filed on Apr. 21, 2011; and WIPO Publication No. WO/2011/156408, titled "Plasma Induced Fluid Mixing," filed on Jun. 7, 2011. Each of these documents is incorporated by reference herein in its entirety.

Figure 2:
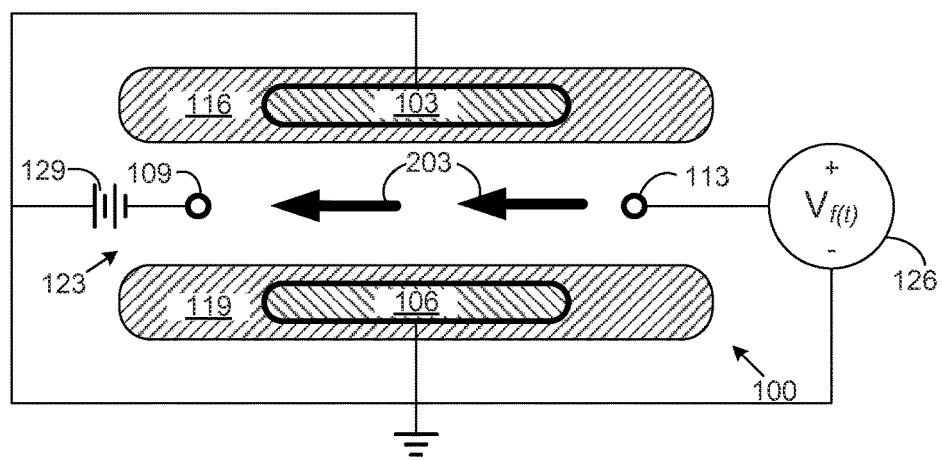

With reference to FIG. 2, shown is another example of the transducer system 100 using an alternative energizing configuration. In the embodiment shown in FIG. 2, the electrode 109 is coupled to the negative terminal of the constant voltage source 129. Additionally, the electrode 113 is coupled to the positive terminal of the time-varying voltage source 126. Thus, the electric potential of the electrode 113 may be higher than the electric potential of the electrodes 103-106. As a result, a Lorentz force may be generated due to the electric field that exists between the electrode 113 and the electrodes 103-106. Additionally, the electric potential of the electrodes 103-106 may be higher than the electric potential of the electrode 109. As a result, a Lorentz force may be generated due to the electric field that exists between the electrodes 103-106 and the electrode 109. The Lorentz forces may induce the flow of fluid in the channel 123 in the direction indicated generally by the arrows 203.

Figure 3:
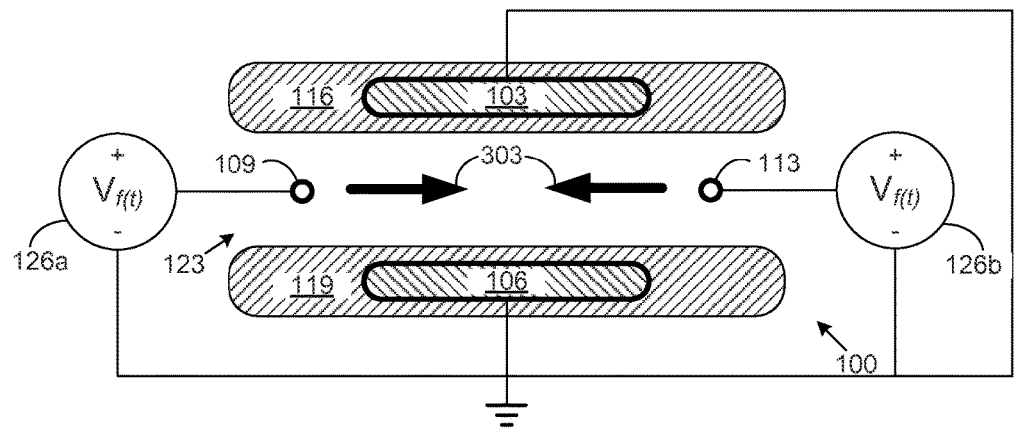

With reference to FIG. 3, shown is another example of the transducer system 100 using an alternative energizing configuration. In the embodiment shown in FIG. 3, the electrode 109 is coupled to the positive terminal of a first time-varying voltage source 126a, and the electrode 113 is coupled to the positive terminal of a second time-varying voltage source 126b. In this configuration, the electric potential of the electrode 109 may be higher than the electric potential of the electrodes 103-106. Thus, a Lorentz force may be generated due to the electric field that exists between the electrode 109 and the electrodes 103-106. Similarly, the electric potential of the electrode 113 may be higher than the electric potential of the electrodes 103-106. As a result, a Lorentz force may be generated due to the electric field that exists between the electrode 113 and the electrodes 103-106. These Lorentz forces may induce the flow of fluid in the channel 123 in the directions indicated generally by the arrows 303.

Figure 4:
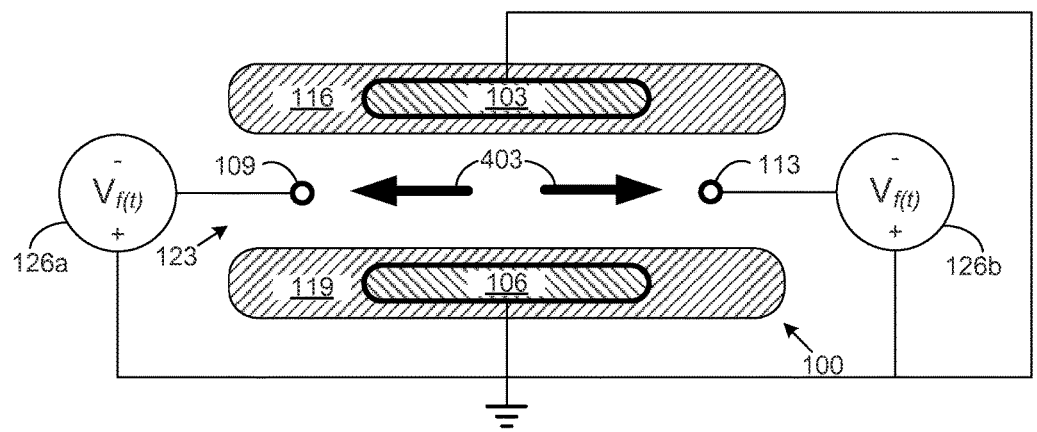

With reference to FIG. 4, shown is another example of the transducer system 100 using an alternative energizing configuration. In the embodiment shown in FIG. 4, the electrode 109 is coupled to the negative terminal of a first time-varying voltage source 126a, and the electrode 113 is coupled to the negative terminal of a second time-varying voltage source 126b. In this configuration, the electric potential of the electrode 109 may be lower than the electric potential of the electrodes 103-106. Thus, a Lorentz force may be generated due to the electric field that exists between the electrode 109 and the electrodes 103-106. Similarly, the electric potential of the electrode 113 may be lower than the electric potential of the electrodes 103-106. As a result, a Lorentz force may be generated due to the electric field that exists between the electrode 113 and the electrodes 103-106. These Lorentz forces may induce the flow of fluid in the channel 123 in the directions indicated generally by the arrows 403.

Figure 5:
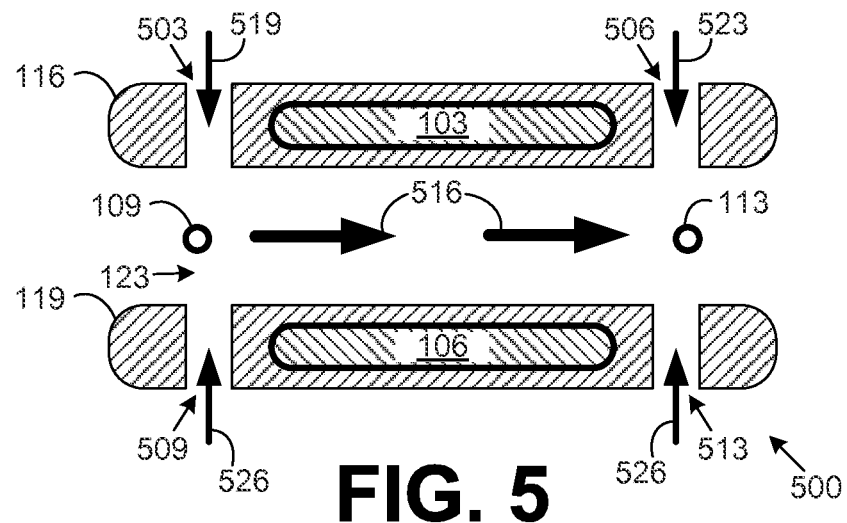

With reference to FIG. 5, shown is an alternative embodiment of a transducer system 100, referred to herein as the transducer system 500. The transducer system 500 is similar to the transducer system 100 discussed with reference to FIG. 1. However, one or more ports 503-513 are formed in the dielectrics 116-119. The ports 503-513 may facilitate the fluid in or near the channel 123 entering and/or exiting the channel 123.

For the embodiment shown in FIG. 5, flow of the fluid is induced in the directions indicated generally by the arrows 516-529. To this end, the electrodes 103-113 may be energized, for example, in the manner shown in FIG. 1.

Figure 6:
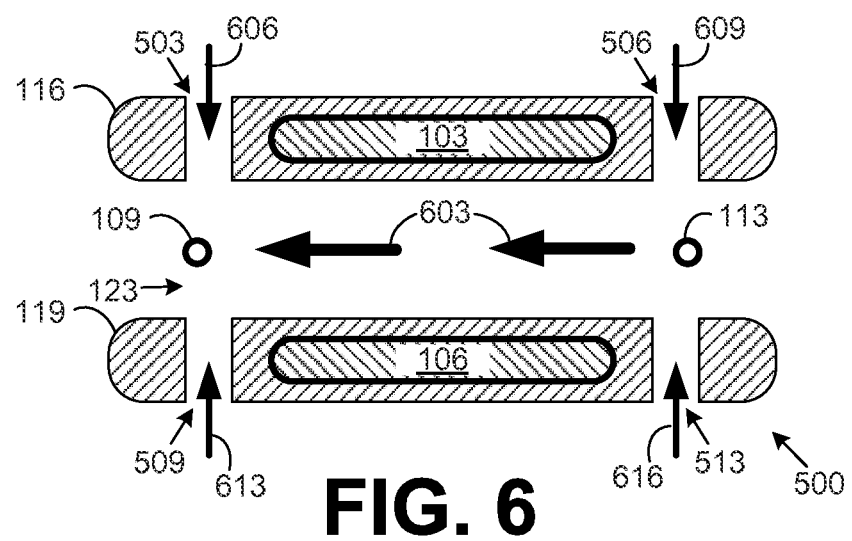

With reference to FIG. 6, shown is another example of the transducer system 500 using an alternative energizing configuration. For the embodiment shown in FIG. 6, flow of the fluid is induced in the directions indicated generally by the arrows 603-616. To this end, the electrodes 103-113 may be energized, for example, in the manner shown in FIG. 2.

Figure 7:
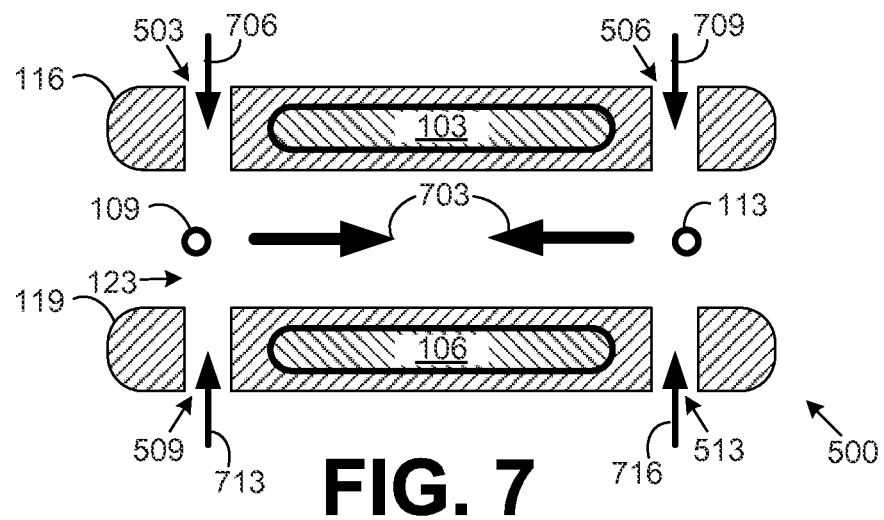

With reference to FIG. 7, shown is another example of the transducer system 500 using an alternative energizing configuration. For the embodiment shown in FIG. 7, flow of the fluid is induced in the directions indicated generally by the arrows 703-716. To this end, the electrodes 103-113 may be energized, for example, in the manner shown in FIG. 3.

Figure 8:
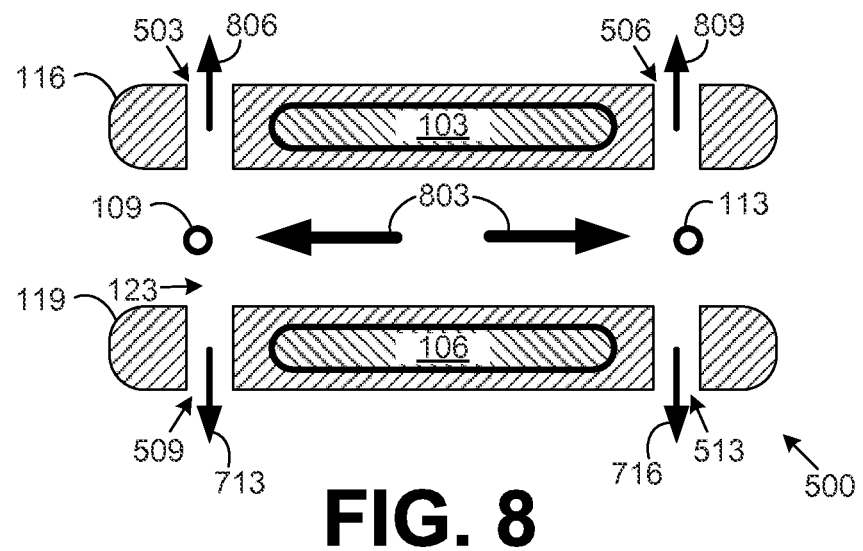

With reference to FIG. 8, shown is another example of the transducer system 500 using an alternative energizing configuration. For the embodiment shown in FIG. 8, flow of the fluid is induced in the directions indicated generally by the arrows 803-816. To this end, the electrodes 103-113 may be energized, for example, in the manner shown in FIG. 4.

Figure 9:
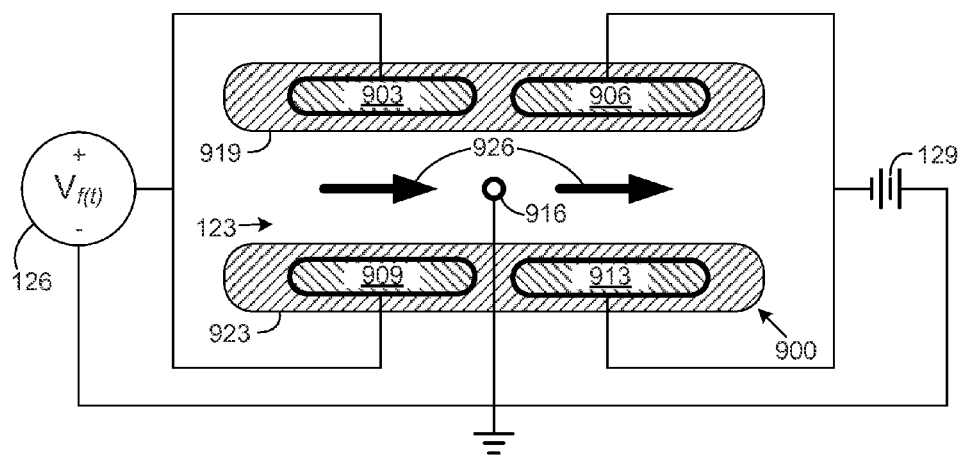

With reference to FIG. 9, shown is an alternative embodiment of a transducer system 100, referred to herein as the transducer system 900. The transducer system 900 shown in FIG. 9 includes electrodes 903-916 and/or other components. The electrodes 903-903 are encapsulated within a first dielectric 919, and the electrodes 909-913 are encapsulated within a second dielectric 923. A channel 123 exists between the dielectrics 919-923, and the electrode 916 is located within the channel 123.

The electrodes 903-916 may be energized by applying various electric potentials to the respective electrodes 903-916. To this end, the electrodes 903-916 may be coupled to one or more power sources, as will be further described. It is emphasized that the various configurations described herein to energize the electrodes 903-916 are non-limiting examples of configurations for energizing the electrodes 903-916. Alternative configurations for energizing the electrodes 903-916 are within the scope of the present disclosure.

In the embodiment shown in FIG. 9, the electrodes 903 and 909 are coupled to the positive terminal of the time-varying voltage source 126. The electrode 916 is coupled to ground, and the electrodes 906 and 913 are coupled to the negative terminal of the constant voltage source 129. As a result, Lorentz forces may induce flow of the fluid in the channel 123 in the direction indicated generally by the arrows 926.

Figure 10:
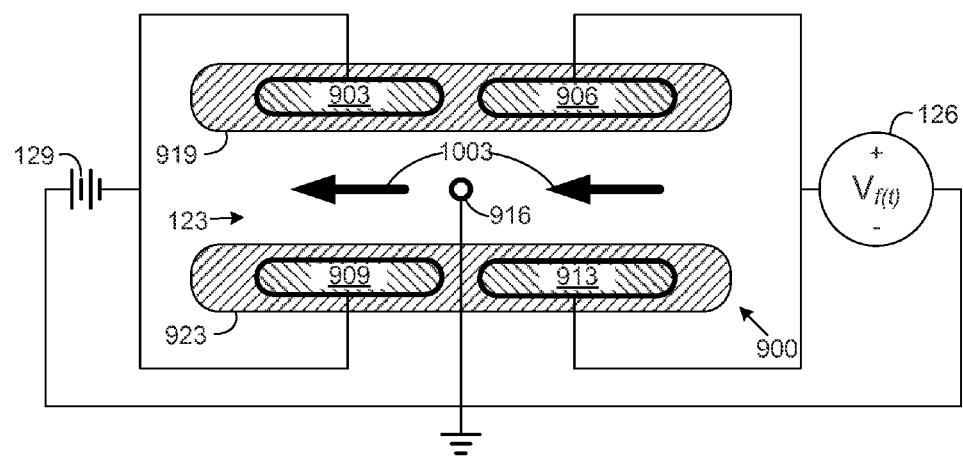

With reference to FIG. 10, shown is an example of the transducer system 900 using an alternative energizing configuration. In this embodiment, the electrodes 903 and 909 are coupled to the negative terminal of the constant voltage source 129. The electrode 916 is coupled to ground, and the electrodes 906 and 913 are coupled to the positive terminal of the time-varying voltage source 126. As a result, Lorentz forces may induce flow of the fluid in the channel 123 in the direction indicated generally by the arrows 1003.

Figure 11:
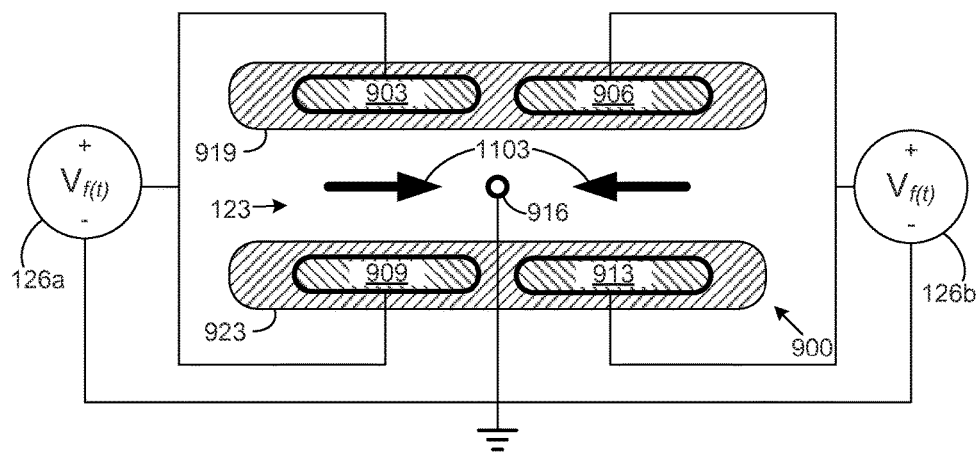

With reference to FIG. 11, show is an example of the transducer system 900 using an alternative energizing configuration. In this embodiment, the electrodes 906 and 909 are coupled to the positive terminal of a first time-varying voltage source 126a, and the electrodes 906 and 916 are coupled to the positive terminal of a second time-varying voltage source 126b. As a result, Lorentz forces may induce flow of the fluid in the channel 123 in the direction indicated generally by the arrows 1103.

Figure 12:
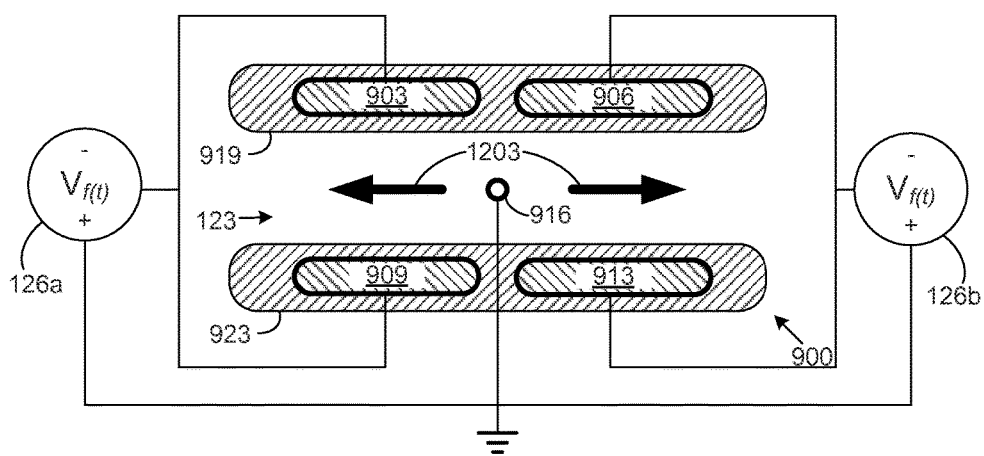

With reference to FIG. 12, show is an example of the transducer system 900 using an alternative energizing configuration. In this embodiment, the electrodes 906 and 909 are coupled to the negative terminal of a first time-varying voltage source 126a, and the electrodes 906 and 916 are coupled to the negative terminal of a second time-varying voltage source 126b. As a result, Lorentz forces may induce flow of the fluid in the channel 123 in the direction indicated generally by the arrows 1203.

Figure 13:
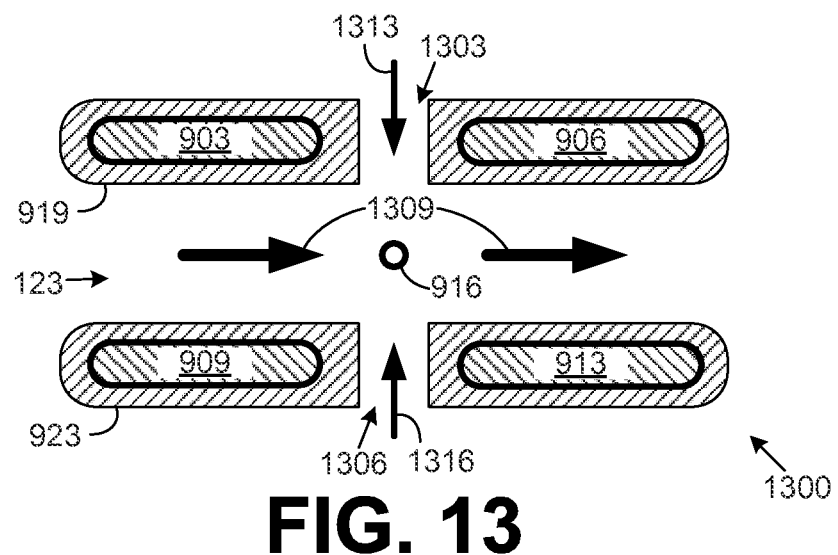

With reference to FIG. 13, shown is an alternative embodiment of a transducer system 100, referred to herein as the transducer system 1300. The transducer system 1300 is similar to the transducer system 900 discussed with reference to FIG. 9. However, one or more ports 1303-1306 are formed in the dielectrics 116-119. The ports 1303-1306 may facilitate the fluid in or near the channel 123 entering and/or exiting the channel 123.

For the embodiment shown in FIG. 13, flow of the fluid is induced in the directions indicated generally by the arrows 1309-1316. To this end, the electrodes 903-916 may be energized, for example, in the manner shown in FIG. 9.

Figure 14:
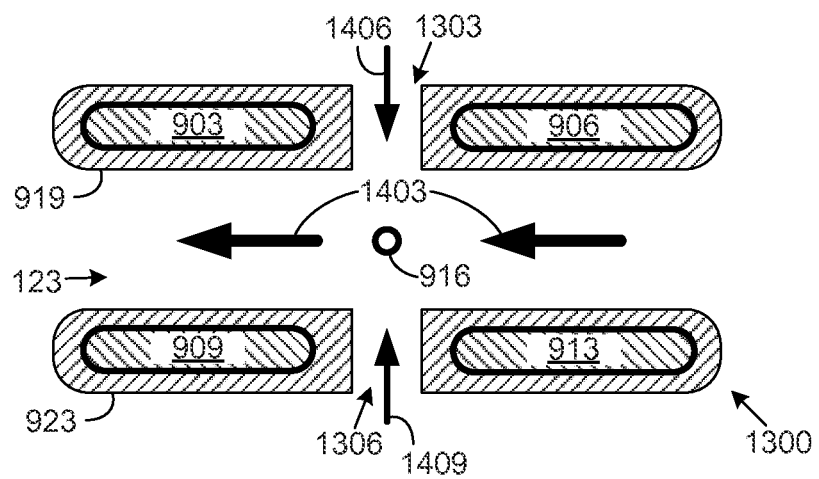

With reference to FIG. 14, shown is another example of the transducer system 1300 using an alternative energizing configuration. For the embodiment shown in FIG. 14, flow of the fluid is induced in the directions indicated generally by the arrows 1403-1409. To this end, the electrodes 903-916 may be energized, for example, in the manner shown in FIG. 10.

Figure 15:
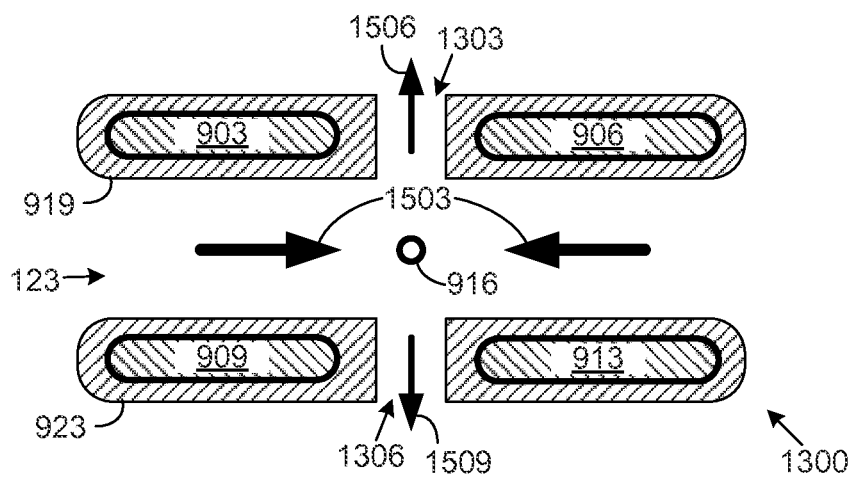

With reference to FIG. 15, shown is another example of the transducer system 1300 using an alternative energizing configuration. For the embodiment shown in FIG. 15, flow of the fluid is induced in the directions indicated generally by the arrows 1503-1509. To this end, the electrodes 903-916 may be energized, for example, in the manner shown in FIG. 11.

Figure 16:
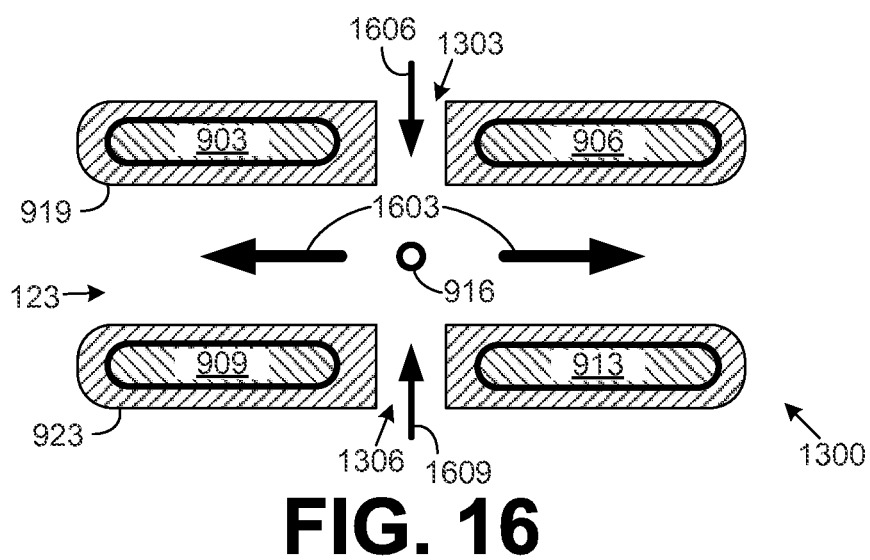

With reference to FIG. 16, shown is another example of the transducer system 1300 using an alternative energizing configuration. For the embodiment shown in FIG. 16, flow of the fluid is induced in the directions indicated generally by the arrows 1603-1609. To this end, the electrodes 903-916 may be energized, for example, in the manner shown in FIG. 12.

Figure 17:
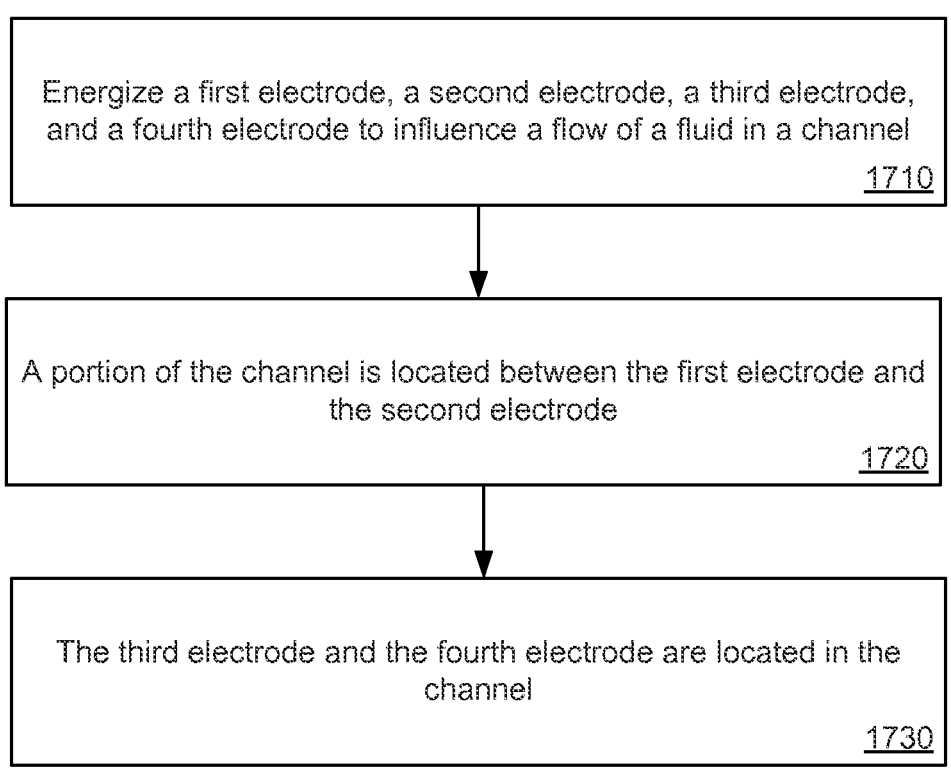
FIG. 17 is a flow chart diagram describing an exemplary method in accordance with embodiments of the present disclosure.

FIG. 17 illustrates an exemplary method of implementing an electro-fluid transducer in accordance with an embodiment of the present disclosure. An exemplary method comprises energizing (1710) a first electrode, a second electrode, a third electrode, and a fourth electrode to influence a flow of a fluid in a channel. Further, a portion of the channel is located (1720) between the first electrode and the second electrode. The third electrode and the fourth electrode are located (1730) in the channel.

It is emphasized that the above-described embodiments of the present disclosure are merely possible examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system comprising:
   a first electrode at least partially encapsulated by a first dielectric on a first wall;
   a second electrode at least partially encapsulated by a second dielectric on a second wall, wherein a channel exists between the first wall and the second wall;
   a third electrode positioned at one end of the channel existing between the first wall and the second wall; and
   a fourth electrode positioned at an opposite end of the channel existing between the first wall and the second wall;
   wherein the electrodes influence a flow of a fluid in the channel upon the electrodes being energized;
   wherein a port is formed in a wall for the channel; and
   wherein the electrodes further influence an additional flow of the fluid through the port, wherein the wall comprises the first wall or the second wall.

2. The system of claim 1, wherein a first electric potential at the third electrode is higher than a second electric potential at the fourth electrode.

3. The system of claim 1, wherein a first electric potential at the third electrode is lower than a second electric potential at the fourth electrode.

4. The system of claim 1, wherein a first electric potential at the third electrode and a second electric potential at the fourth electrode are higher than a third electric potential at the first electrode and the second electrode.

5. The system of claim 1, wherein a first electric potential at the third electrode and a second electric potential at the fourth electrode are lower than a third electric potential at the first electrode and the second electrode.

6. A method comprising:
   energizing a first electrode, a second electrode, a third electrode, and a fourth electrode to influence a flow of a fluid in a channel;
   wherein a portion of the channel is located between the first electrode and the second electrode;
   wherein the third electrode and the fourth electrode are located in a middle of the channel; and
   wherein a port is formed in a wall for the channel, and the electrodes further influence an additional flow of the fluid through the port.

7. The method of claim 6, wherein energizing the first electrode, the second electrode, the third electrode, and the fourth electrode comprises:
   establishing a first electric potential at the third electrode; and
   establishing a second electric potential at the fourth electrode, wherein the second electric potential is lower than the first electric potential.

8. The method of claim 6, wherein energizing the first electrode, the second electrode, the third electrode, and the fourth electrode comprises:
   establishing a first electric potential at the third electrode; and
   establishing a second electric potential at the fourth electrode, wherein the second electric potential is higher than the first electric potential.

9. The method of claim 6, wherein energizing the first electrode, the second electrode, the third electrode, and the fourth electrode comprises:
   establishing a first electric potential at the third electrode and the fourth electrode; and
   establishing a second electric potential at the first electrode and the second electrode, wherein the first electric potential is higher than the second electric potential.

10. The method of claim 6, wherein energizing the first electrode, the second electrode, the third electrode, and the fourth electrode comprises:
    establishing a first electric potential at the third electrode and the fourth electrode; and
    establishing a second electric potential at the first electrode and the second electrode, wherein the first electric potential is lower than the second electric potential.

11. The method of claim 6, wherein at least one of the first electrode, the second electrode, the third electrode, or the fourth electrode is energized using a time varying voltage source.

12. A system comprising:
    a first electrode and a second electrode associated with a first side of a channel;
    a third electrode and a fourth electrode associated with a second side of the channel; and
    a fifth electrode positioned in a middle of the channel;

wherein the electrodes influence a flow of a fluid in the channel upon the electrodes being energized.

13. The system of claim 12, wherein:
the first electrode and the second electrode are at least partially encapsulated by a first dielectric; and
the third electrode and the fourth electrode are at least partially encapsulated by a second dielectric.

14. The system of claim 12, wherein a port is formed in the first side, and wherein the electrodes further influence an additional flow of the fluid through the port.

15. The system of claim 12, wherein a first electric potential at the first electrode and the third electrode is higher than a second electric potential at the second electrode and the fourth electrode.

16. The system of claim 12, wherein a first electric potential at the first electrode and the third electrode is lower than a second electric potential at the second electrode and the fourth electrode.

17. The system of claim 12, wherein a first electric potential at the first electrode, the second electrode, the third electrode, and the fourth electrode is higher than a second electric potential at the fifth electrode.

18. The system of claim 12, wherein a first electric potential at the first electrode, the second electrode, the third electrode, and the fourth electrode is lower than a second electric potential at the fifth electrode.

19. A system comprising:
a first electrode at least partially encapsulated by a first dielectric on a first wall;
a second electrode at least partially encapsulated by a second dielectric on a second wall, wherein a channel exists between the first wall and the second wall;
a third electrode positioned at one end of the channel existing between the first wall and the second wall; and
a fourth electrode positioned at an opposite end of the channel existing between the first wall and the second wall;
wherein the electrodes influence a flow of a fluid in the channel upon the electrodes being energized; and
wherein a first electric potential at the third electrode and a second electric potential at the fourth electrode are higher than a third electric potential at the first electrode and the second electrode.

20. A method comprising:
energizing a first electrode, a second electrode, a third electrode, and a fourth electrode to influence a flow of a fluid in a channel by establishing a first electric potential at the third electrode and the fourth electrode; and establishing a second electric potential at the first electrode and the second electrode, wherein the first electric potential is higher than the second electric potential;
wherein a portion of the channel is located between the first electrode and the second electrode; and
wherein the third electrode and the fourth electrode are located in a middle of the channel.

* * * * *